Patented June 7, 1932

1,862,075

UNITED STATES PATENT OFFICE

EDGAR C. BRITTON AND RALPH P. PERKINS, OF MIDLAND, MICHIGAN, ASSIGNORS TO THE DOW CHEMICAL COMPANY, OF MIDLAND, MICHIGAN, A CORPORATION OF MICHIGAN

MANUFACTURE OF CYCLOHEXYLPHENOLS

No Drawing.   Application filed June 25, 1930. Serial No. 463,826.

The present invention relates to the manufacture of cyclohexylphenols, particularly to a method for preparing ortho- and para-cyclohexylphenols conjointly.

We have found that chlorocyclohexane can be reacted with phenol to form ortho- and para-cyclohexylphenols conjointly, according to the reaction:

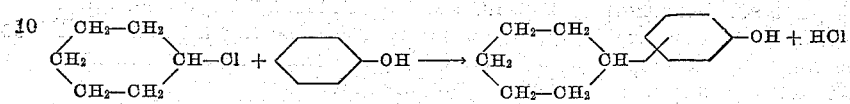

Said reaction may be carried out with or without a material acting as a catalyst, such as a siliceous material, e. g. Tonsil, fuller's earth, or silica gel, and with or without the presence of a material capable of fixing the hydrochloric acid liberated in the reaction.

Our invention, then, consists of the method hereinafter fully described and particularly pointed out in the claims, the following description setting forth in detail several modes of carrying out the invention, such disclosed modes illustrating, however, but several of various ways in which the principle of our invention may be used.

In carrying out our invention, chlorocyclohexane is reacted with phenol, which may or may not be in excess of the theoretical amount required according to the above equation, preferably at a temperature between about 150° and 350° C. The reaction may be carried out continuously or discontinuously in any suitable apparatus under atmospheric pressure, or under increased or diminished pressure, in either the liquid or gaseous phase. For instance, chlorocyclohexane and phenol in the preferred proportions, and, if desired, a catalyst or a substance to react with the mineral acid liberated in the reaction, or both the latter two materials, may be heated in an autoclave provided with a means for agitating the reaction components, until the reaction is substantially completed, the reaction mixture cooled, filtered from catalyst and insoluble materials, if present, and then fractionally distilled to separate unreacted phenol, cyclohexylphenols, and higher condensation products therefrom.

The mixed cyclohexylphenols may then be treated in any preferred way to separate the same into the para and ortho components. For instance, the mixed product may be separated into the desired compounds by fractional crystallization from a suitable organic solvent such as carbon tetrachloride, benzene, toluene or naphtha, or the mixed product may be dissolved in a hot aqueous solution of sodium hydroxide and the sodium salt of the para compound crystallized therefrom. The sodium salt of the ortho compound may be crystallized from the residual liquor, or the latter may be acidified with a mineral acid, e. g. hydrochloric acid, and the so precipitated ortho compound separated from the liquor by filtration thereof.

The following examples illustrate several modes of carrying out our invention:—

*Example 1.*—A mixture of 80.5 grams (0.68 mole) of chlorocyclohexane, 191 grams (2.03 moles) of phenol, 28.3 grams (0.68 mole) of flake sodium hydroxide, and 20 grams Tonsil, was heated in a rotating iron autoclave for one hour at a temperature between about 230° and 250° C. The reaction mixture was cooled, filtered from sodium chloride and catalyst, and then fractionally distilled, thereby obtaining 124 grams (1.32 moles) of unreacted phenol, 89 grams (0.51 mole) of cyclohexylphenols, or a 75% yield, and 11 grams of higher condensation products. The mixed cyclohexylphenols were dissolved in 190 cc. of hot aqueous 14% sodium hydroxide, the so obtained solution then being cooled, whereupon 38.3 grams of para-cyclohexylphenol crystallized out in the form of the sodium salt thereof. About 50 grams of ortho-cyclohexylphenol was obtained from the filtrate by acidification thereof with hydrochloric acid and filtration of the solution to separate the precipitated ortho compound.

*Example 2.*—Chlorocyclohexane and phenol were reacted in the same amounts and in the same manner as described in Example 1, excepting that the sodium hydroxide was replaced by 30 grams (0.54 mole) of powdered calcium oxide. By fractional distillation of the crude reaction product there was obtained 137 grams (1.46 moles) of phenol, 74.5 grams (0.42 mole) of cyclohexylphenols, or a 63% yield, and 12.7 grams of higher condensation products. 24 grams of para-cyclohexylphenol was isolated from the mixed cyclohexylphenol fraction as described in Example 1, approximately 50 grams of the corresponding ortho compound then being recovered from the residual solution.

*Example 3.*—Chlorocyclohexane and phenol were reacted as described in Example 2, excepting that the surface catalyst, i. e. Tonsil, was omitted and the reactants were heated to a temperature between 245° and 325° C. for one hour. Fractional distillation of the crude reaction product yielded, in addition to unreacted phenol, 61 grams (0.35 mole) of mixed cyclohexylphenols, or a 52% yield, and 16.6 grams of higher condensation products. 17 grams of para-cyclohexylphenol was separated from the mixed cyclohexylphenols, and 43 grams of ortho compound also recovered, as described in Example 1.

*Example 4.*—A mixture of 80.5 grams (0.68 mole) of chlorocyclohexane and 191 grams (2.03 moles) of phenol was heated in a rotating autoclave for one hour at a temperature of 220° to 230° C. After cooling, the reaction mixture was washed with water and fractionally distilled, thereby yielding 112 grams (1.19 moles) of recovered phenol, 97.5 grams (0.55 mole) of mixed cyclohexylphenols, i. e. an 81.5% yield, and 17 grams of higher condensation products. 44 grams of para-cyclohexylphenol was separated in the form of a sodium salt from the mixed cyclohexylphenols, and about 52 grams of the ortho compound recovered from the residual solution as described in Example 1.

*Example 5.*—A mixture of 118.5 grams (1 mole) of chlorocyclohexane and 376 grams (4 moles) of phenol was heated at a temperature between 135° and 185° C. for about 5 hours under a reflux condenser. By working up the reaction mixture as in the above examples, there was obtained 271 grams of unreacted phenol and 117 grams (.665 mole) of mixed cyclohexylphenols, or a 66.5% yield, the latter being separated into 34 grams of the para isomer and 83 grams of the ortho isomer.

We do not limit our invention to the specific reactants mentioned above. For instance, phenol may be replaced by other phenolic compounds, e. g. the cresols or phenylphenols, and the chloro-cyclohexane by other halo-hydrocarbons, e. g. alkyl chlorocyclohexanes or equivalent bromo compounds.

Briefly, our invention comprises reacting between phenol and chlorocyclohexane, or compounds equivalent for the hereindescribed use, the reaction taking place with or without a surface catalyst such as Tonsil or other siliceous earth and with or without the presence of a material to react and fix the hydrogen chloride liberated in the reaction, such as an alkaline-earth oxide or hydroxide, e. g. calcium oxide, or an alkali-metal hydroxide, e. g. sodium hydroxide.

Other modes of applying the principle of our invention may be employed instead of those explained, change being made as regards the method herein disclosed, provided the details stated by any of the following claims or the equivalent of such be employed.

We therefore particularly point out and distinctly claim as our invention:—

1. The method of making an alicyclic substituted phenolic compound, which comprises reacting a phenol with a cyclohexyl compound, containing a nuclear halogen substituent, at a temperature between 150° and 350° C.

2. The method of making a cyclohexylphenol, which comprises reacting a phenol with a halogenated cyclohexane at a temperature between 150° and 350° C.

3. The method of making a cyclohexylphenol, which comprises reacting phenol with chlorocyclohexane at a temperature between 150° and 350° C.

4. The method of making a cyclohexylphenol, which comprises reacting phenol with chlorocyclohexane at a temperature between 150° and 350° C., and in the presence of a substance capable of neutralizing the hydrogen halide liberated in the reaction.

5. The method of making a cyclohexylphenol, which comprises reacting phenol with chlorocyclohexane at a temperature between 150° and 350° C., and in the presence of at least one member of the group consisting of a basic alkaline-earth compound and a basic alkali-metal compound.

6. The method of making a cyclohexylphenol, which comprises reacting phenol with chlorocyclohexane at a temperature between 150° and 350° C., in the presence of at least one member of the group consisting of a basic alkaline-earth compound and a basic alkali-metal compound, and in the presence of a surface catalyst.

7. The method of making a cyclohexylphenol, which comprises reacting phenol with chlorocyclohexane at a temperature between 150° and 350° C., in the presence of at least one member of the group consisting of a basic alkaline-earth compound and a basic alkali-metal compound, and in the presence of a siliceous catalyst.

8. The method of making ortho- and para-cyclohexylphenols conjointly, which comprises reacting phenol with chlorocyclohexane at a temperature between about 150° and 350°

C., and recovering said ortho and para compounds from the reaction mixture.

9. In a method of making ortho- and para-cyclohexylphenols conjointly, the step of reacting phenol with chlorocyclohexane at a temperature between about 150° and 350° C., and under superatmospheric pressure.

Signed by us this 20th day of June, 1930.

EDGAR C. BRITTON.
RALPH P. PERKINS.